Sept. 12, 1967   H. E. MUELLER ET AL   3,340,588
METHOD OF MAKING HEAT EXCHANGERS
Original Filed Oct. 19, 1960   2 Sheets-Sheet 1
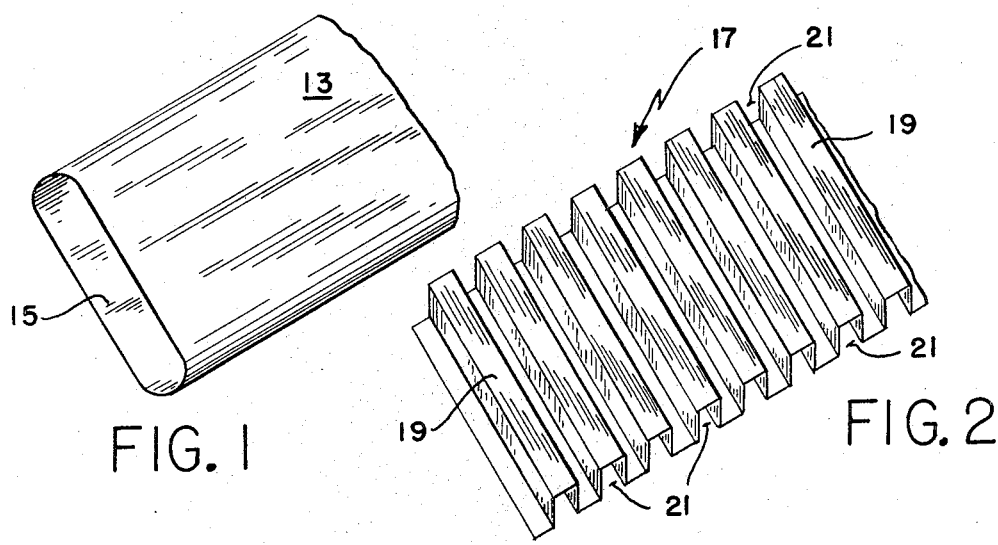
FIG. 1
FIG. 2
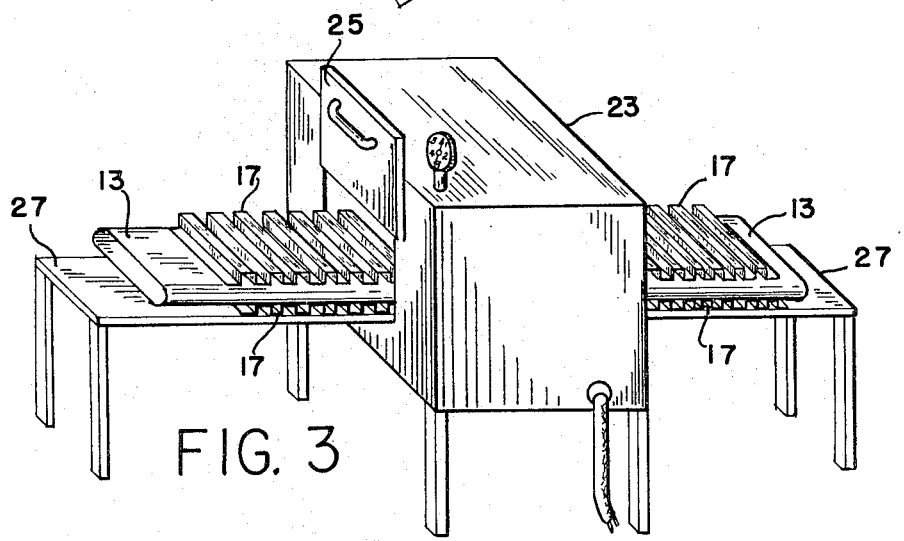
FIG. 3
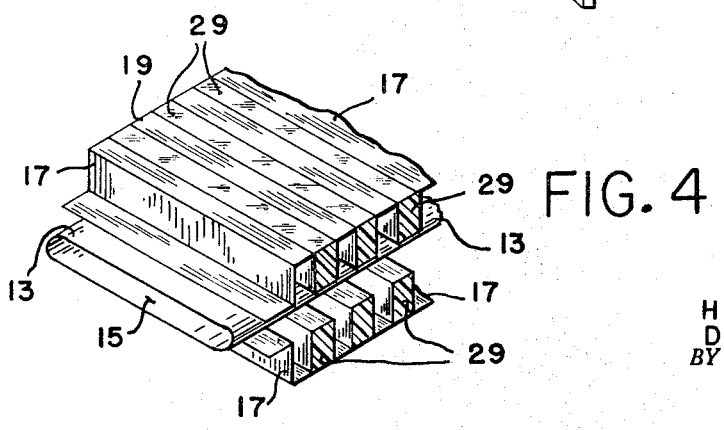
FIG. 4
INVENTORS
HEINZ E. MUELLER &
DIETRICH E. SINGELMANN
BY
ATTORNEYS Sept. 12, 1967  H. E. MUELLER ET AL  3,340,588
METHOD OF MAKING HEAT EXCHANGERS
Original Filed Oct. 19, 1960  2 Sheets-Sheet 2

INVENTORS
HEINZ E. MUELLER &
DIETRICH E. SINGELMANN
BY
ATTORNEYS

United States Patent Office 3,340,588
Patented Sept. 12, 1967

3,340,588
METHOD OF MAKING HEAT EXCHANGERS
Heinz E. Mueller, Littleton, Colo., and Dietrich E. Singelmann, Buffalo, N.Y., assignors to the United States of America as represented by the Secretary of the Air Force
Original application Oct. 19, 1960, Ser. No. 63,691. Divided and this application Dec. 11, 1962, Ser. No. 243,981
3 Claims. (Cl. 29—157.3)

This application is a division of our copending application Ser. No. 63,691, filed on Oct. 19, 1960, now abandoned.

This invention relates to a method of manufacturing spiral heat exchangers and particularly to the fabrication, assembly, and manufacture of unusually large spiral heat exchangers designed to carry a fluid coolant therethrough.

In the design and production of heat exchangers for operation at extreme temperature differences, their size is generally limited to the size of the brazing furnace available. This is so because the conventional method of manufacturing spiral heat exchangers is to first assemble the unit, then wind it in spiral form, and finally braze the wound unit in a brazing furnace. To produce unusually large heat exchangers, the size of the brazing furnace would necessarily be prohibitive for practical and efficient operation. The present invention overcomes this problem by disclosing a method of producing spiral heat exchangers of any desired size using a brazing furnace of ordinary proportions. This is accomplished by first assembling the elements of the heat exchanger in proper relative position and then feeding the assembled unit through a brazing furnace. After the brazing operation has been completed the unit is wound into its spiral form to any desired size. Thus, it can be seen that by manufacturing spiral heat exchangers in the manner herein described, their final dimensions are not limited by the size of the brazing furnace.

Accordingly, it is an object of this invention to provide a method of manufacturing unusually large spiral heat exchanger utilizing a brazing furnace of ordinary size.

Another object of the invention is to provide a heat exchanger which is capable of being wound after it has been brazed.

Still another object of the invention is to provide a method of winding a spiral heat exchanger after brazing by inserting filler blocks in alternate recesses in the radiating member to prevent collapse of the fin members.

A still further object of the invention is to provide a method of winding a spiral heat exchanger with corrugated fins brazed on both sides of a fluid carrying tube section. To prevent meshing action of the fins of adjacent spirals, a separating strip is included therebetween.

These and other objects, features and advantages, such as simplicity of construction and efficiency of operation, will become more apparent from the following description taken in connection with the illustrative embodiments depicted in the accompanying drawings wherein:

FIGURE 1 shows a thin walled conduit through which the fluid coolant passes;

FIGURE 2 shows a thin gauge corrugated metallic radiating member for attachment to the surface of the conduit shown in FIGURE 1;

FIGURE 3 shows a brazing furnace adapted to handle any length of assembled fluid conducting and corrugated radiating members being fed through in a continuous brazing operation;

FIGURE 4 shows a section of brazed heat exchanger with filler blocks inserted in alternate recesses between the corrugations of the radiating members to prevent collapse and deformation of the fins during the winding operation;

Figure 5:
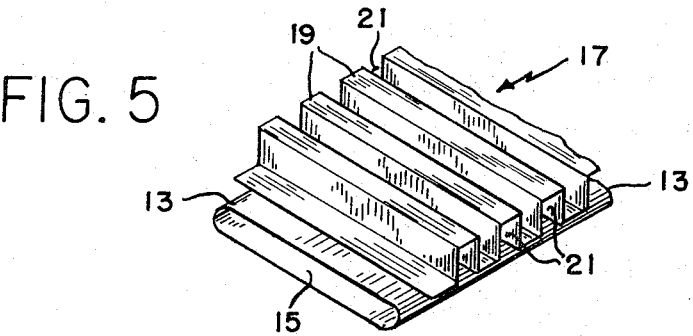
FIGURE 5 shows an embodiment of the invention wherein only a single corrugated radiating member is attached to the surface of the conduit.

Referring now to the drawings wherein like reference characters refer to like elements in the various views, in FIGURE 1 there is shown a thin walled conduit 13 having an inner opening 15 for conducting a fluid heat exchanging medium therethrough. The conduit 13 is preferably fabricated from a dense material such as copper, monel, or stainless steel and may be polygonal, circular, or some combination thereof in cross-sectional configuration.

Attached to the outer surface of said conduit 13 is a radiating member 17 shown in FIGURE 2 which includes a plurality of corrugations 19 made up of a series of recesses 21. The member 17 may be fabricated from a thin metallic sheet which is crimped or corrugated into the desired shape. The corrugations are rectangular in cross-section but may be triangular, hemispherical, or any other desirable shape.

In FIGURE 3 there is shown an assembled view of the conduit 13 and radiating members 17 passing through a brazing furnace 23, which has a front opening 25 therein. A platform 27 is provided upon which the assembled heat exchanger may be guided through the furnace 23. A rear opening (not shown) is also included in the furnace to allow the brazed portion of the assembled heat exchanger to pass therethrough similar to a conveyor belt arrangement. It will be noted that the brazing furnace 23 is of relatively small size compared to that which would be required if the heat exchanger were spirally wound before brazing. The assembled heat exchanger may be of any desired length.

After the heat exchanger has passed through the brazing furnace 23 thereby permanently attaching the radiating member 17 to the conduit 15, the assembly is ready to be spirally wound. In order to prevent buckling or bending of the thin metallic fins of the radiating member 17 during the winding procedure, it is desirable to place the filler blocks 29 in every other recess between the corrugations. These blocks (shown in FIG. 4) may be made of wood, plastic or some low-temperature melting alloy and are to be removed after winding.

Figure 6:
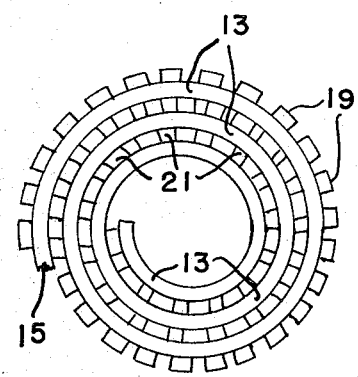
FIGURE 6 shows the heat exchanger of FIGURE 5 wound into a spiral shape.

In FIGURE 5 a simpler form of heat exchanger is shown having fins 17 on one side only of the conduit 13. When this assembly is spirally wound a unit of the type shown in FIGURE 6 results. This single radiating member type of heat exchanger is most useful where a smaller size unit is required. Since the conduit 13 ordinarily carries fluid under relatively high pressures only a smaller size assembly of this type would have strength enough to withstand the internal forces acting on the conduit walls.

Figure 7:
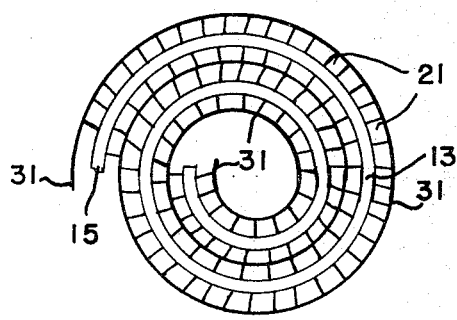
FIGURE 7 shows another embodiment of the invention wherein a corrugated radiating member is attached to both sides of the conduit.
Figure 8:
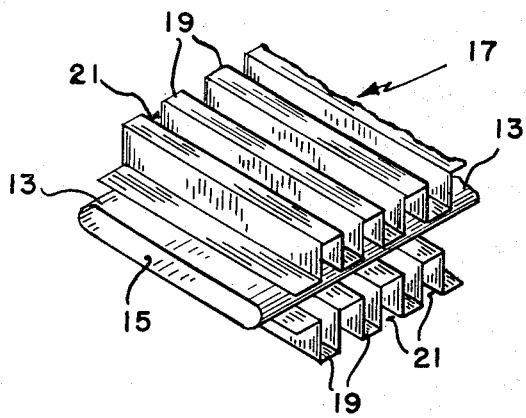
FIGURE 8 shows the conduit of FIGURE 7 wound into a spiral shape and includes a spacer strip between adjacent corrugated fin layers.

For the larger diameter heat exchangers, it is most desirable to mount radiating members on both the upper and lower surfaces of the conduit 13. The radiating fins thus attached serve as reinforcements against bulging out of the flat conduit by the force of the inner pressure. In FIGURES 7 and 8, there is shown the double radiating member type of spiral heat exchangers. When this latter type assembly is wound it is necessary to introduce a separating strip 31 in order to avoid a meshing action of the adjacent radiating members 17 after the filler blocks 29 are removed.

It should be understood that the drawings show only a single example of radiating member fin shapes. Circular arc corrugations or pointed triangular corrugations as well as other shapes may be used in place of the rectangular embodiment shown. Also, a series of separate pipes may be attached to the central fluid conduit in a transverse direction in place of the continuous fin producing strip. The pipe arrangement would operate to cool the air as it passed through the individual openings.

One of the uses of the heat exchanger described herein is for cooling the intake air which is rammed into the forward section of a jet engine. At extremely high speeds the intake air reaches temperatures which would be detrimental to efficient operation of the engine. It is therefore necessary to lower the ram temperature before the air reaches the combustion chamber. This can be accomplished by means of the heat exchanger herein described by positioning within the engine air inlet the spirally wound unit in such a manner that the incoming air would necessarily pass over the radiating member and fluid conduit. Liquid hydrogen, which is used as a fuel in certain high altitudes, high velocity flights, may be used as the coolant fluid. Because of the very low temperature of the liquid hydrogen and the high temperature of the ram air, a great deal of thermal expansion and contraction takes place. To allow the heat exchanger to follow these thermal movements, the coil is mounted so as to be free to wind and unwind to some extent. In certain instances it may be desirable to tack-weld one spiral coil winding to the next at selected spots in order to limit movements within the heat exchanger. In cases where larger pressure drops through the air passages of the heat exchanger are expected, a cross frame behind the heat exchanger face can be arranged for load carrying purposes.

Although only certain embodiments of our invention have been described herein, it will be apparent to those skilled in the art that various changes may be made in the construction and relative size of the elements without departing from the true spirit and scope of the invention.

Having thus described our invention, what we claim as new and desire to secure by Letters Patent of the United States is:

1. The method of fabricating a spiral heat exchanger having a means provided for conducting a fluid coolant therethrough comprising the steps of positioning a corrugated radiating member in contact with the outer surface of a laterally elongated fluid conducting tubular member, brazing said positioned members by passage through a heated furnace using a continuous brazing process, inserting filler blocks into the recesses in the corrugations of said radiating member, attaching a separating strip to the outermost extremities of the corrugations on said radiating member, winding said brazed heat exchanger and attached separating strip into spiral form, said separating strip serving to prevent meshing action of adjacently disposed sections of said corrugating member, and removing said filler blocks from the corrugations in said radiating member thereby allowing substantially free passage of heat carrying gaseous fluid through the area between adjacent windings of the tubular member.

2. The method of fabricating a spiral heat exchanger comprising the steps of flattening a circular tube to form a laterally elongated tubular member, corrugating a thin metallic strip transversely to form radiating member having a plurality of recesses therein, positioning said corrugated strip on said laterally elongated tubular member such that the bottom walls of alternate recesses contact the outer wall of said tubular member, brazing said positioned strip and tubular member by passage through a heated furnace using a continuous brazing process, inserting filler blocks into alternate recesses in the corrugations of said radiating member, winding said brazed heat exchanger into spiral form, and removing said filler blocks from the alternate recesses in said corrugated radiating members thereby allowing substantially passage of heat carrying gaseous fluid through the area between adjacent windings of the tubular member.

3. The method of fabricating a spiral heat exchanger having a means provided for conducting a fluid coolant therethrough comprising the steps of positioning a corrugated radiating member having recesses therein on each side of a laterally elongated fluid conducting tubular member, said corrugated members being positioned such that the bottom walls of alternate recesses contact opposite outer walls of said tubular member, permanently attaching said positioned radiating members to said tubular member by passage through a heated furnace using a continuous brazing process, inserting filler blocks into the recesses in alternate recesses in the corrugations of said radiating members, attaching a separating strip to the top wall of alternate recesses in one of said brazed radiating members, winding said brazed heat exchanger and attached separating strips into spaced convolute relationship such that said separating strip serves to prevent meshing action of adjacently disposed corrugated members, and removing said filler blocks from the alternate recesses in said radiating members thereby allowing substantially free passage of heat carrying gaseous fluid through the area between adjacent windings of said spiral heat exchanger.

References Cited

UNITED STATES PATENTS

| 2,693,026 | 11/1954 | Simpelaar | 29—157.3 |
| 3,007,680 | 11/1961 | Harris | 29—157.3 X |
| 3,021,804 | 2/1962 | Simpelaar | 29—157.3 X |
| 3,071,187 | 1/1963 | Fairbanks | 29—157.3 X |

BENJAMIN A. BORCHELT, *Primary Examiner.*

SAMUEL FEINBERG, *Examiner.*

R. F. STAHL, *Assistant Examiner.*